United States Patent
Brandt et al.

(10) Patent No.: US 11,548,153 B2
(45) Date of Patent: Jan. 10, 2023

(54) ROBOT COMPRISING SAFETY SYSTEM ENSURING STOPPING TIME AND DISTANCE

(71) Applicant: Universal Robots A/S, Odense S (DK)

(72) Inventors: David Brandt, Ferritslev Fyn (DK); Esben Hallundbæk Østergaard, Odense C (DK)

(73) Assignee: UNIVERSAL ROBOTS A/S, Odense S (DK)

( * ) Notice: Subject to any disclaimer, the term of this patent is extended or adjusted under 35 U.S.C. 154(b) by 0 days.

(21) Appl. No.: 16/772,270

(22) PCT Filed: Dec. 13, 2018

(86) PCT No.: PCT/EP2018/084854
§ 371 (c)(1),
(2) Date: Jun. 12, 2020

(87) PCT Pub. No.: WO2019/115738
PCT Pub. Date: Jun. 20, 2019

(65) Prior Publication Data
US 2021/0086374 A1  Mar. 25, 2021

(30) Foreign Application Priority Data
Dec. 14, 2017 (EP) .................................. 17207387

(51) Int. Cl.
*B25J 9/16* (2006.01)
*B25J 19/00* (2006.01)
*B25J 19/06* (2006.01)

(52) U.S. Cl.
CPC ........... *B25J 9/1674* (2013.01); *B25J 9/1664* (2013.01); *B25J 19/0004* (2013.01); *B25J 19/06* (2013.01);
(Continued)

(58) Field of Classification Search
CPC .... B25J 19/0004; B25J 9/1633; B25J 9/1664; B25J 9/1674; B25J 19/06;
(Continued)

(56) References Cited

U.S. PATENT DOCUMENTS 4,819,184 A * 4/1989 Jonsson ............... G05B 19/373
700/250
7,664,570 B2 2/2010 Suita et al.
(Continued)

FOREIGN PATENT DOCUMENTS

DE 10361132 A1 * 1/2005 ............ B25J 9/1674
DE 10361132 A1 1/2005
(Continued)

OTHER PUBLICATIONS

International Search Report for PCT/EP2018/084854, 5 pages (dated Jun. 20, 2019).
(Continued)

*Primary Examiner* — Abby Y Lin
*Assistant Examiner* — Karston G. Evans
(74) *Attorney, Agent, or Firm* — Burns & Levinson LLP

(57) ABSTRACT

A robot system and method for conditionally stopping a robot, wherein a maximum stopping time and/or distance are defined by a user or integrator through a user interface as safety limits based on the risk assessment. The method provides the continuous calculation of the time and/or distance, which the robot would need to stop under maximum motor torque and/or brake appliance. The robot is stopped or the speed of the robot is reduced, if the calculated time and/or distance exceeds the maximum limit values set by the user or integrator. The method may also be used to program or generate the trajectories of the robot as not to
(Continued)

exceed the speed of the movement under the condition of keeping the set maximum stopping time and/or distance as defined by a use.

18 Claims, 7 Drawing Sheets

(52) U.S. Cl.
CPC .............. *G05B 2219/39097* (2013.01); *G05B 2219/39098* (2013.01)

(58) Field of Classification Search
CPC ........... G05B 2219/39097; G05B 2219/39098; G05B 1/00; Y10S 901/02
See application file for complete search history.

(56) References Cited

U.S. PATENT DOCUMENTS

| | | | |
|---|---|---|---|
| 8,614,559 | B2 | 12/2013 | Kassow et al. |
| 9,248,573 | B2 | 2/2016 | SøE-knudsen et al. |
| 9,833,897 | B2 | 12/2017 | Søe-knudsen et al. |
| 10,399,232 | B2 | 9/2019 | Oestergaard et al. |
| 2003/0225479 | A1 | 12/2003 | Waled |
| 2011/0060462 | A1* | 3/2011 | Aurnhammer ......... B25J 9/1674 700/255 |
| 2012/0109374 | A1* | 5/2012 | Lee ...................... G05B 19/416 700/245 |
| 2013/0079928 | A1 | 3/2013 | Søe-knudsen et al. |
| 2013/0255426 | A1 | 10/2013 | Kassow et al. |
| 2016/0136805 | A1 | 5/2016 | Søe-knudsen et al. |
| 2016/0176049 | A1 | 6/2016 | Tronnier et al. |
| 2017/0057095 | A1* | 3/2017 | Oestergaard ............. B25J 19/06 |
| 2017/0201195 | A1* | 7/2017 | Bonnett .................. G05B 1/00 |
| 2018/0081340 | A1* | 3/2018 | Haddadin .......... G05B 19/4061 |
| 2018/0178380 | A1 | 6/2018 | Oestergaard et al. |
| 2019/0086907 | A1 | 3/2019 | Oestergaard et al. |
| 2020/0171658 | A1 | 6/2020 | Kielsholm Thomsen |
| 2020/0384649 | A1* | 12/2020 | Tschamuter ........... B25J 9/1602 |

FOREIGN PATENT DOCUMENTS

| | | |
|---|---|---|
| DE | 102015106227 B3 | 5/2016 |
| EP | 1632318 A2 | 3/2006 |
| EP | 1901150 B1 | 10/2008 |
| EP | 2364243 B1 | 1/2012 |
| JP | 5778891 B2 * | 9/2015 |
| KR | 20120045766 A * | 5/2012 |

OTHER PUBLICATIONS

Written Opinion for PCT/EP2018/084854, 9 pages (dated Jun. 20, 2019).

Jeremy A. Marvel et al.: "Implementing speed and separation monitoring in collaborative robot workcells", Robotics and Computer Integrated Manufacturing, Elsevier Science Publishers BV., Barking, GB, vol. 44, Aug. 27, 2016, pp. 144-155, ISSN: 0736-5845, DOI: 10.1016/J.RCIM.2016.08.001, XP029830786.

Communication pursuant to Article 94(3) EPC for European Patent Application No. 18814984.3, dated Jan. 20, 2022, (12 pages).

Abssac: "Model BXW Compact design spring-actuated brakes", XP055879230, Nov. 5, 2014, [retrieved on Jan. 14, 2022 https://www.abssac.co.uk/uploads/docs/csfkayy6_Safety_Brakes.pdf].

* cited by examiner

ROBOT COMPRISING SAFETY SYSTEM ENSURING STOPPING TIME AND DISTANCE

CROSS-REFERENCE TO RELATED APPLICATIONS

This application is a national stage entry of PCT Application No. PCT/EP2018/084854, which was filed on Dec. 13, 2018. PCT Application No. PCT/EP2018/084854 claims priority to European Patent Application No. EP17207387.6, which was filed on Dec. 14, 2017. This application claims priority to PCT Application No. PCT/EP2018/084854 and to European Patent Application No. EP17207387.6. The contents of PCT Application No. PCT/EP2018/084854 and of European Patent Application No. EP17207387.6 are incorporated herein by reference.

FIELD OF THE INVENTION

The present invention relates to a method for adjusting the trajectories for an industrial robot based on requirements for maximum allowed stopping time or stopping distance travel.

BACKGROUND OF THE INVENTION

An important part of the installation of an industrial robot as part of an application is to perform a risk assessment to evaluate if the installation is sufficiently safe. A result of a risk assessment can be that given the distance from a safeguarding measure to a potential hazard in the robot workspace, and the estimated speed of motion of a human worker, the robot integrator needs to ensure that the robot is capable of stopping within a certain amount of time.

For the integrator, it is a tedious and time consuming process to evaluate the stopping time of the robot. This is usually based on tables for given speeds, payloads, extensions and joint motions provided by the robot manufacturer. However, the high degree of flexibility in industrial manipulators with multiple degrees of freedom makes it infeasible to provide tables for all possible motions and payloads, thus leading to a need for interpolating between the various tables and combining this with actual measurements to validate the results and often also being overly conservative in the estimates.

U.S. Pat. No. 7,664,570B2 describes a method for limiting the motions of a robot according to physical and virtual safety barriers. It does however not consider the stopping time and distance traveled by the robot while stopping. The focus is on assuring that the robot does not cross the virtual or physical barriers.

EP1901150B1 describes a method where the calculation of stopping time and distance travel is used for predicting collisions with objects. It does however not allow the user to define stopping time limits or stopping distance limits.

EP2364243B1 describes a safety system and a method for reducing risk of injury based on an impact. It does however not describe considerations to stopping time and stopping distances.

US2016/176049A1 discloses a method for the conditional stopping of at least one manipulator and a manipulator assembly. The manipulator travels along a path which has a stopping point. In order to be able to stop the manipulator at the stopping point, a braking point on the path is calculated as a function of a speed of the manipulator. If the status of a travel condition variable necessitates braking of the manipulator in the event of exceeding the braking point, the manipulator is braked. This manipulator and manipulator assembly requires knowledge of the desired stopping point along the predetermined traveling path.

DE10361132A1 discloses a method for monitoring the movement of a hazardous object such as the handling mass of a handling unit relative to objects in a workspace around it. The kinetic energy of the hazardous object is constantly calculated by means of a dynamic model of the handling device and the speed of the dangerous object is constantly readjusted and monitored so that at a braking request within a defined path or optionally within a defined time the speed is reduced to a to a predeterminable non dangerous value. It is difficult to determine the kinetic energy of a hazardous object handled by handling device such as a robot arm as in order to obtain speed of the hazardous object need to be obtained in order to calculate the kinetic energy of the hazardous object. In a handling device such as a robot the speed of the hazardous object is typically obtained based on absolute positions sensors at the output side of the robot joints and the resolution of such absolute position sensors are low resulting in an inaccurate instant speed of the hazardous object. Consequently, the kinetic energy will also be calculated inaccurately.

SUMMARY OF THE INVENTION

The object of the present invention is to address the above described limitations with the prior art or other problems of the prior art.

This is achieved by providing a robot system comprising:
  a robotic manipulator having multiple degrees of freedom;
  a robot controller with control software for controlling the robotic manipulator;
  a user interface; and
  a safety system monitoring the motions of the robotic manipulator, the safety system is capable of bringing the robotic manipulator to a safe stand still.

The robot manipulator can for instance be provided as a robot arm comprising a plurality of robot joints and robot links connecting a robot base and a robot tool flange, where joint motors are configured to rotate the robot joints and links in relation to each other. The robot controller can be provided as any computing device configured to control the robot manipulator for instance by controlling the motor torque provided by the joint motors based on a dynamic model of the robotic manipulator. The robot controller can be provided as an external device as illustrated in FIG. 3 or as a device integrated into the robot manipulator.

The user interface can for instance be provided as a teach pendent as known from the field of industrial robots which can communicate with the controller via wired or wireless communication protocols. The user interface can for instance comprise a display and a number of input devices such as buttons, sliders, touchpads, joysticks, track balls, gesture recognition devices, keyboards etc. The display may be provided as a touch screen acting both as display and input device. According to the present invention the interface comprises input means enabling a robot user to configure at least one of a stopping time limit and a stopping distance limit. The input means can be provided as any kind of interface device enabling a robot user to configure the stopping time limit and stopping distance limit, for instance as a software program where the robot user can enter the stopping time limit and/or the stopping time distance limit. The stopping time limit and/or the stopping time distance limit can for instance indicate the desired values for stopping time and/or stopping distance of the robotic manipulator and may be determined by the robot user based on a safety risk assessment of the installation where the robot system is used. The stopping time limit and/or the stopping distance limit can be stored in a memory for later usage.

The safety system can be provided as any computing device capable of monitoring the motions of the robotic manipulator and bringing the robotic manipulator to a safe stand still upon safety issues. The safety system can for instance be provided as a part of the controller or as a separate computing device such as controllers, logic devices, micro-processors or the like. The safety system may for instance be provided as two redundant safety systems monitoring the motions of the robotic manipulator simultaneously and independently. According to the present invention the safety system is configured to modelling the dynamics of the robotic manipulator comprising determining at least one of a maximum possible brake torque and a maximum possible brake force that can be applied by motors and gears of the robotic manipulator, a drive brake system of the robotic manipulator or a combination of the motors, gears and the drive brake system. Consequently, the maximum brake torques and/or brake forces that can be applied to the robotic manipulator at any given time during use of the robotic manipulator is determined by the safety system. The maximum brake torques and/or brake forces can be determined based on a dynamic model of the robot manipulator and properties of the motors, gears or brake drive of the robotic manipulator. Also, the safety system is configured to dynamically and continuously determining if the maximum possible brake torque, the maximum possible brake force or a combination of the maximum possible brake torque and the maximum possible brake force can stop motion of the robotic manipulator within at least one of the stopping time limit and the stopping distance limit. The safety system is configured to triggering stopping of the robotic manipulator in case that at least one of the maximum possible brake torque, the maximum possible brake force or a combination of the maximum possible brake torque and the maximum possible brake force cannot stop motion of the robotic manipulator within at least one of the stopping time limit and the stopping distance limit.

Triggering stopping of the robotic manipulator based on the maximum possible brake torque, maximum possible brake force, a stopping time limit and/or a stopping distance limit makes it possible for a robot user to provide as safety assessment of the robot installation which considers desired stopping time and/or distance of the robotic manipulator. The safety system can thus be configured to monitor the motions of the robot manipulator accordantly and ensure safety stop of the robotic manipulator. The robot user need only to specify the desired stopping time and/or stopping distance one time and the safety system will ensure safety stop if desired stopping time and/or stopping distance cannot be achieved by the robot manipulator. Determining the maximum possible brake torques/forcers ensures a robust and safe operation of the safety system as the maximum possible brake torques/forces directly determines minimal stopping time or stopping distance of the robotic manipulator whereas the kinetic energy only expresses how much kinetic energy that needs to be taken out of the robotic manipulator in order to stop the robotic manipulator.

In one embodiment the safety system is configured to dynamically and continuously calculate at least one of:

an estimated stopping time, that the robot manipulator would spend to stop when applying at least one of the maximum possible torque and the maximum possible force; and an estimated stopping distance traveled by the robot manipulator while stopping when applying at least one of the maximum possible torque and the maximum possible force;

and triggering stopping of the robotic manipulator in case that at least one of:

the estimated stopping time exceeds the stopping time limit; and the estimated stopping distance exceeds the stopping distance limit.

This makes it possible to trigger the safety stop of the robotic manipulator directly based on the defined stopping limit and/or distance limit. Further the estimated stopping time and estimated stopping distance can during operation of the robotic manipulator be indicated to the robot user, whereby the robot user can act in relation the indicated estimated stopping time and/or distance.

In one embodiment the safety system is configured to extrapolate the estimated stopping time and the estimated stopping distance from the current state of the robotic manipulator where the maximum possible torque and/or the maximum possible force is applied for stopping the current motion of the robotic manipulator, where the extrapolation is performed until the robot manipulator is predicted to have reached a complete stop.

In one embodiment the safety system is configured to dynamically and continuously calculating a needed brake torque and/or a needed brake force required for stopping the robotic manipulator within at least one of the stopping time limit and the stopping distance limit; and triggering stopping of the robotic manipulator in case that at least one of:

the needed brake torque exceeds the maximum possible brake torque; and the needed brake force exceeds the maximum possible brake force.

This makes it possible to trigger the stopping directly based on the maximum possible brake torque and/or force that can be provided by the motors, gears and/or a drive brake of the robotic manipulator.

For instance, in one embodiment the safety system can comprise two independent safety branches where a first safety branch is configured to trigger stopping of the robotic manipulator based on the estimated stopping time/distance and where a second safety branch is configured to trigger stopping of the robotic manipulator based on the needed brake torque/force and the maximum possible brake torque/force. Consequently, the safety system can ensure that the robotic manipulator can be stopped within the specified stopping time limit and/or stopping distance limit using two different and independent methods, whereby a robust and redundant safety system can be provided.

In one embodiment the control software of the robot controller is configured to generate a number of robot trajectories for solving given tasks and controlling the robotic manipulator based on the robot trajectories, and the control software of the robot controller is configured to generate at least one of the of robot trajectories based on at least one of the stopping time limit and the stopping distance limit. This makes it possible for the robot user during programming of the robot to ensure that the generated robot trajectories fulfill the safety requirements in relation to the desired stopping time and/or stopping distance. Consequently, the robot user does not need to consider these requirements during programming as the robot controller automatically ensure that they are fulfilled.

In one embodiment the control software of the robot controller is configured to generate at least one of the of robot trajectories by:
  modelling the dynamics of the robotic manipulator during the trajectory comprising determining at least one of a maximum possible brake torque and a maximum possible brake force that can be applied by motors and gears of the robotic manipulator, a drive brake system of the robotic manipulator or a combination of the motors and gears and the drive brake system of the robotic manipulator at any given point in time during the robot trajectory;
  at any given point in time during the robot trajectory determining if the maximum possible brake torque, the maximum possible brake force or a combination of the maximum possible brake torque and the maximum possible brake force can stop motion of the robotic manipulator within at least one of the stopping time limit and the stopping distance limit;
  shaping the trajectory by changing the speed of motion of the trajectory such that at least one of the maximum possible brake torque, the maximum possible brake force or a combination of the maximum possible brake torque and the maximum possible brake force at any given point in time during the robot trajectory can stop motion of the robotic manipulator within at least one of the stopping time limit and the stopping distance limit.

In one embodiment the control software of the robot controller is configured to generate at least one of the robot trajectories by:
  estimating at least one of:
    an estimated stopping time, that the robot manipulator would spend to stop when applying at least one of the maximum possible torque and the maximum possible force; and
    an estimated stopping distance traveled by the robot manipulator while stopping when applying at least one of the maximum possible torque and the maximum possible force;
  and
  shaping the trajectory by changing the speed of motion of the trajectory such that at any given point in time during the trajectory the estimated stopping time does not exceed the stopping time limit and/or the estimated stopping distance does not exceed the stopping distance limit.

In one embodiment the control software of the robot controller is configured to generate at least one of the robot trajectories by:
  at any given point in time during the robot trajectory dynamically and continuously calculating a needed brake torque and/or a need brake force required for stopping the robotic manipulator within at least one of the stopping time limit and the stopping distance limit;
  shaping the trajectory by changing the speed of motion of the trajectory such that at any given point in time during the trajectory the needed brake torque is smaller than the maximum possible brake torque and/or the needed brake force is smaller than the maximum possible brake force.

In one embodiment the safety system is implemented by the use of redundancy of either sensors, communication, logics or any combination of them.

The present invention relates also to a method of controlling a robot system as described above where the method comprises the steps of:
  configuring at least one of a stopping time limit and a stopping distance limit using the user interface;
  monitoring the motions of the robotic manipulator using the safety system, where the step of monitoring the motions of the robotic manipulator comprises the steps of:
    modelling the dynamics of the robotic manipulator comprising determining at least one of a maximum possible brake torque and a maximum possible brake force that can be applied by motors and gears of the robotic manipulator, a drive brake system of the robotic manipulator or a combination of the motors, gears and the drive brake system of the robotic manipulator;
    dynamically and continuously determining if the maximum possible brake torque, the maximum possible brake force or a combination of the maximum possible brake torque and the maximum possible brake force can stop motion of the robotic manipulator within at least one of the stopping time limit and the stopping distance limit;
    triggering stopping of the robotic manipulator in case that at least one of the maximum possible brake torque, the maximum possible brake force or a combination of the maximum possible brake torque and the maximum possible brake force cannot stop motion of the robotic manipulator within at least one of the stopping time limit and the stopping distance limit.

In one embodiment the step of monitoring the motions of the robotic manipulator using the safety system comprises the steps of:
  dynamically and continuously calculating at least one of:
    an estimated stopping time, that the robot manipulator would spend to stop when applying at least one of the maximum possible torque and the maximum possible force; and
    an estimated stopping distance traveled by the robot manipulator while stopping when applying at least one of the maximum possible torque and the maximum possible force;
  and
  triggering stopping of the robotic manipulator using the safety system in case that at least one of:
    the estimated stopping time exceeds the stopping time limit; and
    the estimated stopping distance exceeds the stopping distance limit.

In one embodiment the step of monitoring comprising a step of extrapolating the estimated stopping time and the estimated stopping distance from the current state of the robotic manipulator by applying the maximum possible torque and/or the maximum possible force for stopping the current motion of the robotic manipulator, where the extrapolation is performed until the robot manipulator is predicted to have reached a complete stop.

In one embodiment of the method the step of monitoring the motions of the robotic manipulator using the safety system, comprises the steps of:
  dynamically and continuously calculating a needed brake torque and/or a need brake force required for stopping the robotic manipulator within at least one of the stopping time limit and the stopping distance limit;
  and triggering stopping of the robotic manipulator in case that
at least one of:
the needed brake torque exceeds the maximum possible brake torque; and
the needed brake force exceeds the maximum possible brake force.

In one embodiment the method comprises a step of generating a number of robot trajectories for solving given tasks and controlling the robotic manipulator based on the robot trajectories using the robot controller. In one embodiment at least one of the robot trajectories is generated based on at least one of the stopping time limit and the stopping distance limit. For instance, the step of generating the at least one robot trajectory comprises the steps of:

modelling the dynamics of the robotic manipulator during the trajectory comprising determining at least one of a maximum possible brake torque and a maximum possible brake force that can be applied by motors and gears of the robotic manipulator, a drive brake system of the robotic manipulator or combination of the motors and gears and the drive brake system of the robotic manipulator at any given point in time during the robot trajectories;

at any given point in time during the robot trajectory determining if the maximum possible brake torque, the maximum possible brake force or a combination of the maximum possible brake torque and the maximum possible brake force can stop motion of the robotic manipulator within at least one of the stopping time limit and the stopping distance limit;

shaping the trajectory by changing the speed of motion of the trajectory such that at least one of the maximum possible brake torque, the maximum possible brake force or a combination of the maximum possible brake torque and the maximum possible brake force at any given point in time during the robot trajectory can stop motion of the robotic manipulator within at least one of the stopping time limit and the stopping distance limit.

For instance, the step of generating the at least one robot trajectories can comprise the steps of:

estimating at least one of:
an estimated stopping time, that the robot manipulator would spend to stop when applying at least one of the maximum possible torque and the maximum possible force; and
an estimated stopping distance traveled by the robot manipulator while stopping when applying at least one of the maximum possible torque and the maximum possible force;

and the trajectory can be shaped by changing the speed of motion of the trajectory such that at any given point in time during the trajectory the estimated stopping time does not exceed the stopping time limit and/or the estimated stopping distance does not exceed the stopping distance limit.

Additionally or alternatively the step of generating the at least one robot trajectories can comprise the steps of:

at any given point in time during the robot trajectories dynamically and continuously calculating a needed brake torque and/or a needed brake force required for stopping the robotic manipulator within at least one of the stopping time limit and a the stopping distance limit;

and the trajectory can be shaped by changing the speed of motion of the trajectory such that at any given point in time during the trajectory the needed brake torque is smaller than the maximum possible brake torque and/or the needed brake force is smaller than the maximum possible brake force.

DETAILED DESCRIPTION OF THE INVENTION

The present invention is described in view of exemplary embodiments only intended to illustrate the principles of the present invention. The skilled person will be able to provide several embodiments within the scope of the claims.

Figure 1:
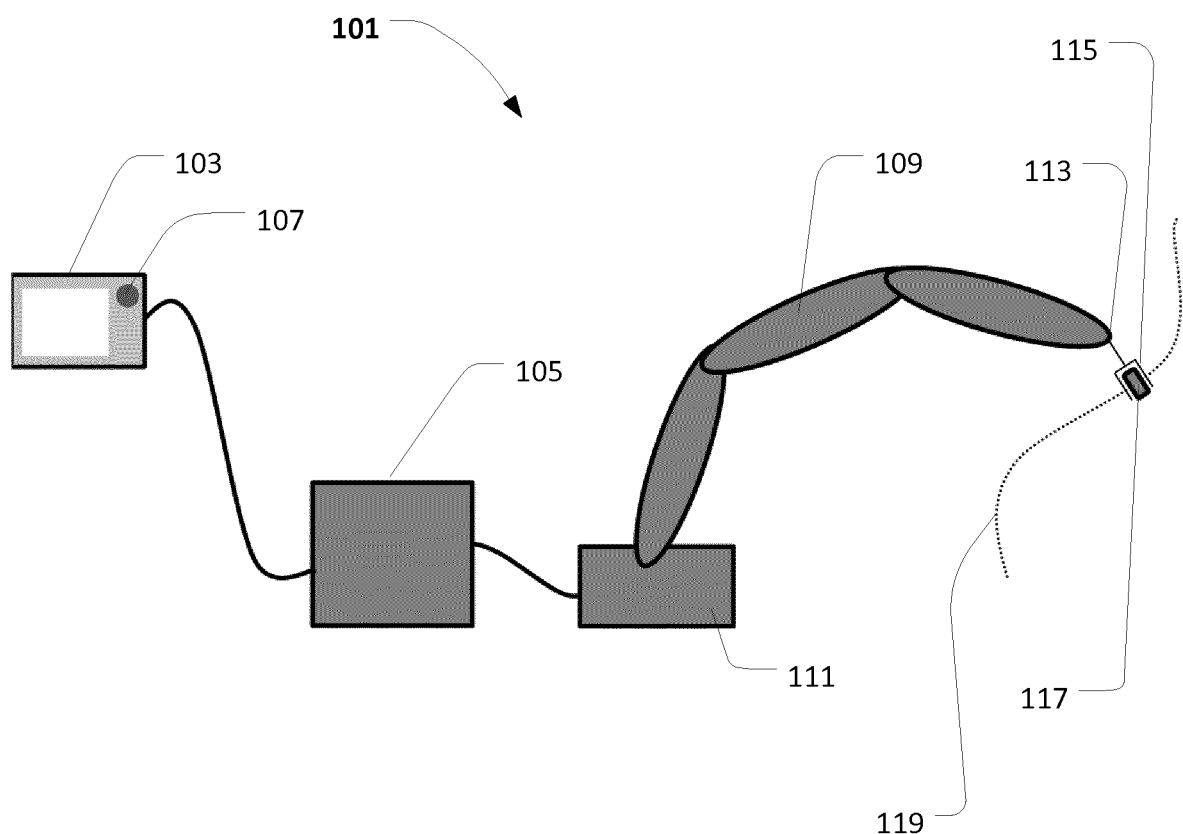
FIG. 1 illustrates the robot system used in the method of present invention.

FIG. 1 illustrated shows an example embodiment of the invention, where the robot system 101 comprises of:

An interface unit 103, connected to the robot controller 105, which is intended for control, programming and/or displaying of status information. The interface unit can be connected either wired or wireless. It is possible to have one interface unit connect to multiple robots or have multiple interface units for one robot. The interface unit comprise a means for triggering the stop of the robot. This can for instance be an emergency stop button 107, an emergency stop input, other types of input, internal sensors which detect potential safety related stop conditions etc. The robot controller 105 computes the robot trajectories. This can be integrated in the robot arm itself, be integrated in the interface unit, be a standalone unit or a combination of these. A robot manipulator 109 provided as a robot arm comprising robot joints and links connecting a robot base 111 and a tool flange 113. A robot end effector 115, which might be able to carry a payload can be attached to the tool flange and a payload 117 is carried by the robot end effector. The presence of a robot end effector is not required by the invention, but it is typically present. The trajectory 119 which the robot is commanded to follow is also illustrated The invention allows the user or integrator of the robot system to use the interface unit 103 to define limits for the time the robot manipulator 109 is allowed to move or the distance it is allowed to travel when the stop trigger emergency stop button 107 is activated. The limits input by the user is used by the robot control software in C to calculate the trajectory 119 in such a way that the stopping time or distance travel of the robot manipulator 109 is always below the required limit while taking the inertia of the robot manipulator 109, the end effector 115 and the payload 117 into account.

The robot system used in the method of the present invention comprises of an industrial robot manipulator with multiple degrees of freedom with built in control software. The system comprises of the following components:

i) An industrial robotic manipulator with multiple degrees of freedom capable of performing complex trajectories as part of solving tasks ii) Computer with control software generating the trajectories for the robot manipulator needed for solving the given tasks.
iii) A safety system which monitors the motions of the robotic manipulator and is capable of bringing the robot to a safe standstill if needed and involving a method for dynamically and continuously calculating if the stopping time and/or stopping distance travel limits can be met.
iv) A user interface which provides a means for the robot user or integrator to configure the stopping time limit.

The system allows the robot integrator to configure the desired stopping time for the application at hand and ensuring that the trajectory of the robot is performed in such a way that the desired stopping time can always be achieved. This can be achieved by shaping of the trajectory of the manipulator or the speed at which the trajectory is performed or a combination of the two. This can be implemented either as part of the control software in the computer or as part of the safety system or in both. Moreover, it is possible to implement it in the control software and have the safety system monitor the correctness of the implementation.

This feature may be extended to also consider the distance travelled by the robot during the braking time. This will ensure that the robot will not move more than a desired maximum distance after the stop command has been executed.

The user interface of the system can be a physical part of the system or it can work from a terminal, PC, tablet, phone which connects to the system by means wired or wireless communication.

The method of the present invention for determining the stopping time of the robot is based on:
A model of the dynamics of the robot (possibly including the payload carried by the robot).
The maximum allowed torque or force applied by the drives (motors and gears) or by the drive brake system or by the combination of drive and brake system.
The current state of the robot (possibly including the payload). The state comprises of joint positions and joint speeds.

The method acts by calculating the required torque/force of the robot drives and/or brakes from the current state and the stopping time and stopping distance travel limits, using the model, and comparing these with the allowed forces or torques from the robot drives.

The method can be performed at any point in time where the ability to stop within the stopping time and stopping distance travel limits needs to be assessed. This includes both the possibility to perform the method online while the robot is moving, potentially moving on a trajectory influenced by sensor information, but it can also be used offline for fixed trajectories, or a combination of these.

The complete method for allowing the user or integrator to easily set the desired limits for stopping distance, stopping time or both comprises of the following elements:
The user/integrator can configure the desired values for stopping time and/or distance using the user interface.
When the robot is moving the stopping time and distance is continuously assessed by the previously described method.
If the time calculated gets close to the user defined limits the methods which calculate the robot trajectories will scale these dynamically by reducing the speed of motion, such that the limits are not exceeded.
Alternatively, if the calculations are based on calculating the force or torque required for stopping and the required force or torque get close to the allowed forces or torques by the robot drives, the method which calculate the robot trajectories will scale these dynamically by reducing the speed of motion, such that the limits are not exceeded.

If a high degree of safety is required, the trajectories calculated by the trajectory generators or the trajectory performed by the robot can be monitored (using the same calculation method as described in the previous section) by a safety system or be constructed according to machinery safety principles.

Figure 2:
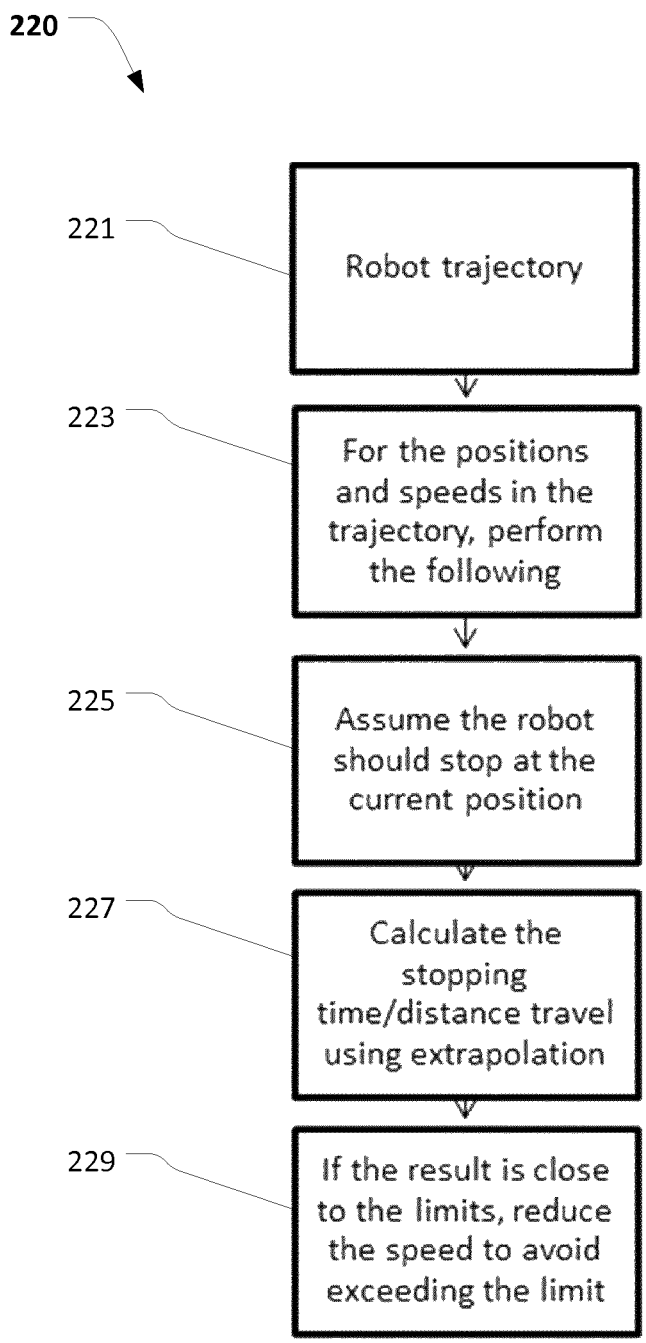
FIG. 2 illustrates a flow diagram of one embodiment of the method of the present invention.
Figure 3:
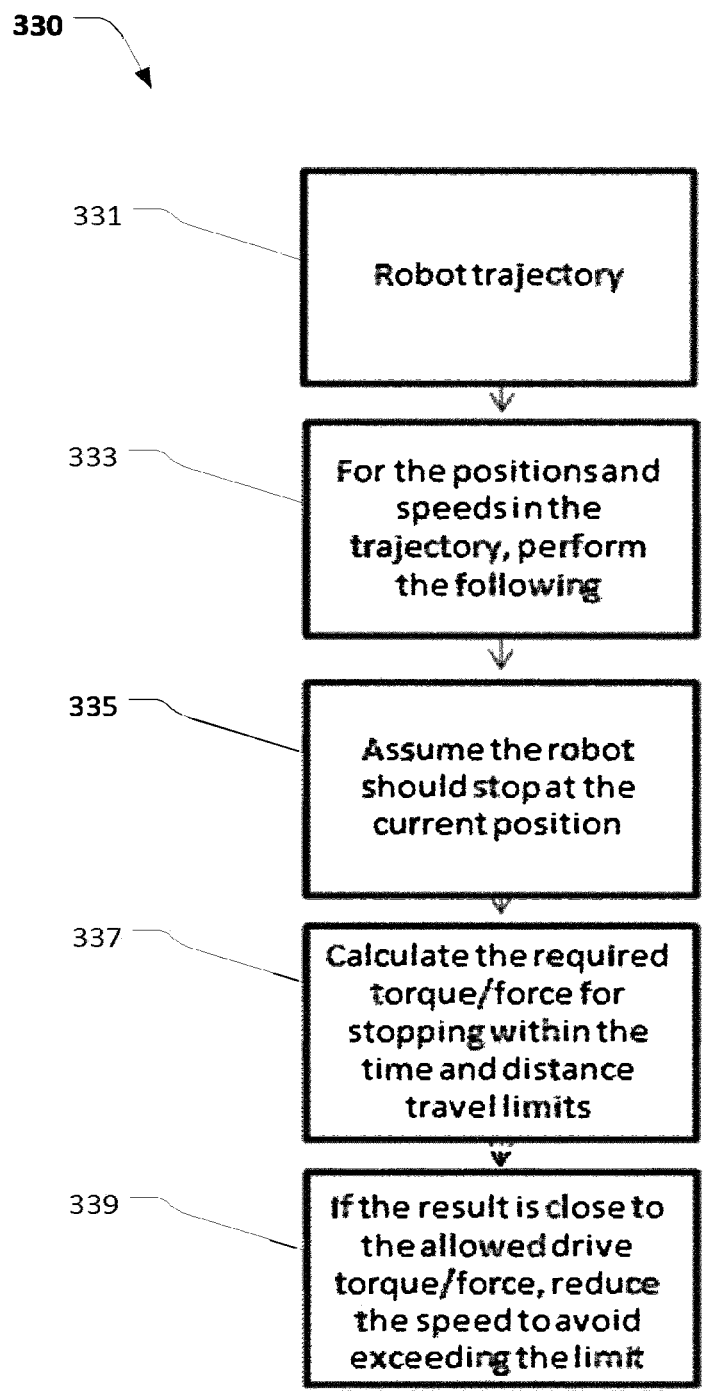
FIG. 3 illustrates a flow diagram of another embodiment of the method of the present invention.

Referring to FIG. 2 illustrating a flow diagram 220 of the basic process used to keep the robot trajectory within the specified stopping time and distance travel limits by calculation of the stopping time or stopping distance travel by extrapolation of the current state. The method comprises the steps of:
221: Controlling the robot by providing at least one robot trajectory
223: For the positions and speeds in the trajectory, perform the following
225: Assume the robot should stop at the current position
227: Calculate the stopping time/distance travel using extrapolation
229: If the result is close to the limits, reduce the speed to avoid exceeding the limit Referring to FIG. 3 illustrating a flow diagram 330 of the basic process used to keep the robot trajectory within the specified stopping time and distance travel limits by calculation of the torque or force by the robot drives for within the given limits for stopping time or stopping distance travel. The method comprises the steps of:
331: Controlling the robot by providing at least one robot trajectory
333: For the positions and speeds in the trajectory, perform the following
335: Assume the robot should stop at the current position
337: Calculate the required torque/force for stopping within the time and distance travel limits
339: If the result is close to the allowed drive torque/force, reduce the speed to avoid exceeding the limit The following paragraphs and statements I-IX below present an alternative disclosure of the present invention.

The present invention provides a means for a user or integrator of a robot to define a specific time or distance limit or both, where in the robot must be capable of stopping. This allows the user to easily define the limits needed based on the risk assessment.

Specifically in a first aspect the present invention provides a method for adjusting the trajectories for an industrial robot based on criteria for maximum allowed stopping time or stopping distance travel, such that the requirements are met independently of when the stop is initiated, said industrial robot having multiple degrees of freedom with built in control software to define a specific time or distance limit or both, wherein the robot is capable of stopping, said method comprises the steps of:
providing control software for generating the trajectories needed for solving the given tasks;
implementing a safety system which monitors the motions of the robotic manipulator and is capable of bringing the robot to a safe standstill, said safety system modelling the dynamics of the robot involving determining the possible torque or force applied by motors and gears of the robot or by the drive brake system or by the combination of drive and brake system;
dynamically and continuously calculating the time the robot would need to stop or distance traveled by the robot while stopping at any given point in time; a user interface, which provides a means for a robot user or integrator to configure the stopping time or stopping distance limit or both; and stopping the robot in case the estimated stopping time or distance of the current robot trajectory exceeds the stopping time or stopping distance limits.

The calculation of the stopping time or stopping distance travel can be done by extrapolation of the current state of the robot. The resolution of the extrapolation in terms of number of time steps or similar can be adjusted according to the need for precision of the calculation.

An alternative embodiment could be to, rather than calculating the time needed to stop and the distance traveled during stopping, at a given point in time calculate the forces or torques required for stopping within the given stopping time and stopping distance travel and compare that to the force and torque capabilities of the robot drives. If the required torque or force exceeds that of the drives allowed capability it is equivalent to the robot not being able to stop within the defined limits.

A further alternative embodiment could be to use the calculations to continuously shape the robot trajectory, by changing the speed of motion, such that the limits for stopping time and stopping distance travel are never exceeded.

Preferably the method is implemented as part of the functional safety of the robot. It is also preferred that the state of the robot is based on joint positions and joint speeds. In a particularly preferred embodiment of the present invention the required stopping torques and forces of the robot drives is calculated from the current state, and used for reducing the speed of the robot if the required torques are near the allowed torques of the drives, such that the stopping time and stopping distance limits are never exceeded.

In accordance with the present invention it is common to calculate both the time it takes for the robot to stop as well as the distance the robot moves while stopping or the required drive force or torque based on the required stopping time or distance traveled. It is furthermore often required by the present invention that the functional safety is implemented by the use of redundancy of either sensors, communication, logics or any combination of them.

In a particularly preferred embodiment the correctness of the implementation and/or execution of the method is monitored by a safety function, which is typically based on redundancy of either sensors, communication, logics or any combination of them.

In a second aspect there is provide a robot system that is able to perform the method of the present invention. The robot system comprises a robot having a robotic manipulator; control software for generating trajectories needed for solving given tasks; and for implementing a safety system which monitors the motions of the robotic manipulator and is capable of bringing the robot to a safe standstill, said safety system modelling the dynamics of the robot involving determining the maximum possible torque or force applied by motors and gears of the robot or by the drive brake system or by the combination of drive and brake system; a means for triggering the stop of the robot while the control software dynamically and continuously calculating the time the robot would need to stop or distance traveled by the robot while stopping at any given point in time; wherein the triggering stopping the robot in case the estimated stopping time or distance of the current robot trajectory exceeds the stopping time or stopping distance limits.

Figure 4:
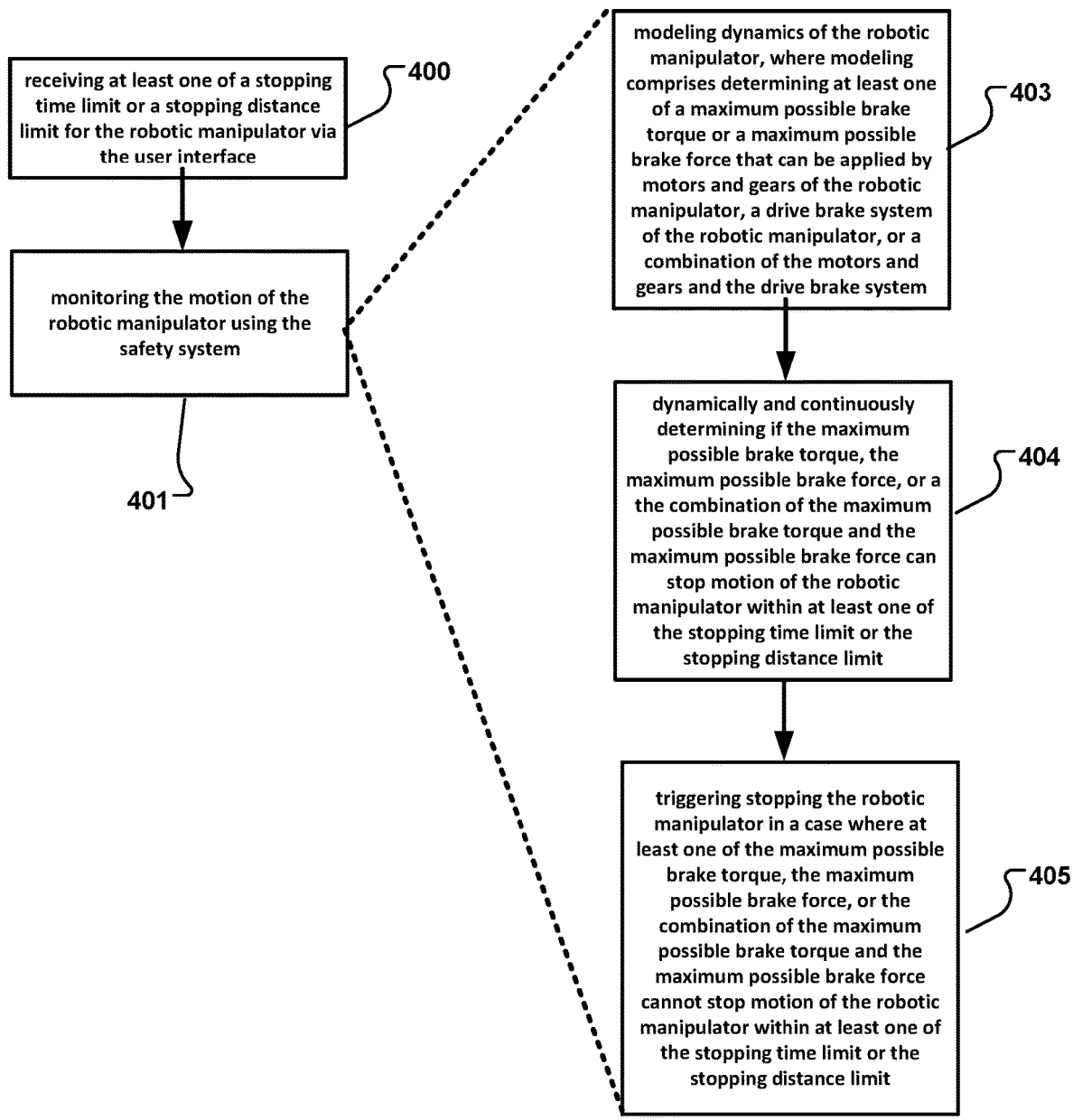
FIG. 4 is a flow diagram of an example process for controlling a robot system.

FIG. 4 shows an example method for controlling a robot system that comprises: a robotic manipulator that is operable in multiple degrees of freedom, a robot controller having control software for controlling the robotic manipulator, a user interface, and a safety system for monitoring motion of the robotic manipulator. The safety system IS configured to bring the robotic manipulator to a stop. The method includes receiving (400) at least one of a stopping time limit or a stopping distance limit for the robotic manipulator via the user interface; and monitoring (401) the motion of the robotic manipulator using the safety system. Monitoring the motion of the robotic manipulator comprises: modeling (403) dynamics of the robotic manipulator, where modeling comprises determining at least one of a maximum possible brake torque or a maximum possible brake force that can be applied by motors and gears of the robotic manipulator, a drive brake system of the robotic manipulator, or a combination of the motors and gears and the drive brake system; dynamically and continuously determining (404) if the maximum possible brake torque, the maximum possible brake force, or a the combination of the maximum possible brake torque and the maximum possible brake force can stop motion of the robotic manipulator within at least one of the stopping time limit or the stopping distance limit; and triggering (405) stopping the robotic manipulator in a case where at least one of the maximum possible brake torque, the maximum possible brake force, or the combination of the maximum possible brake torque and the maximum possible brake force cannot stop motion of the robotic manipulator within at least one of the stopping time limit or the stopping distance limit.

Figure 5:
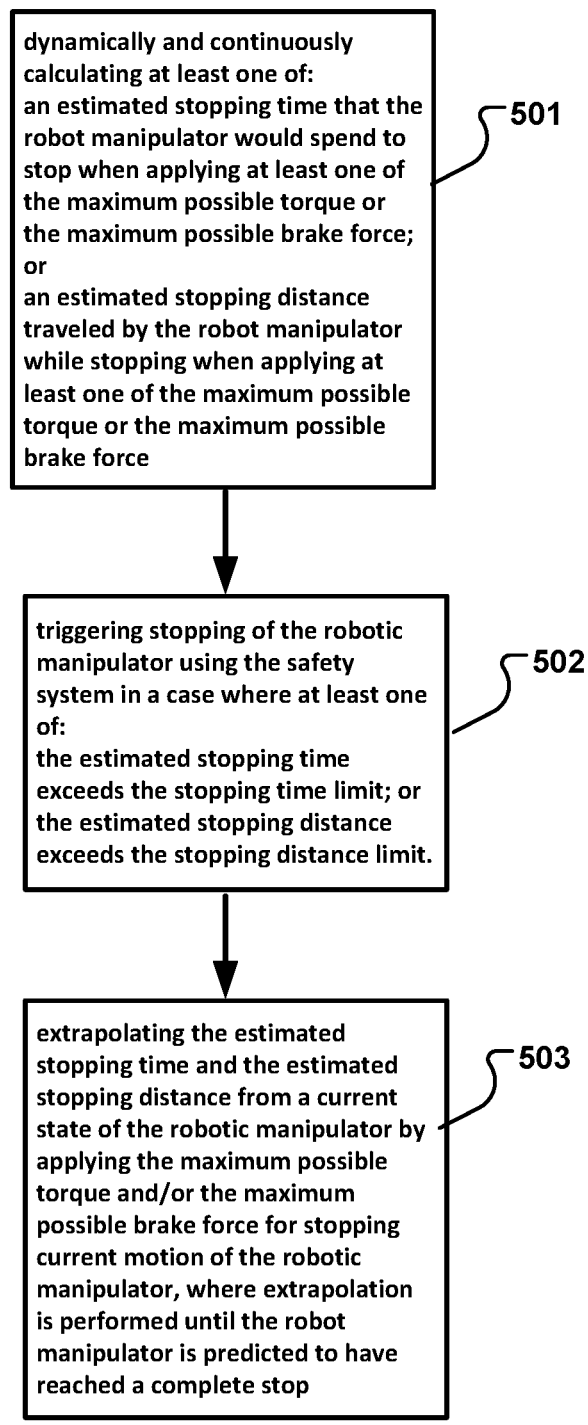
FIG. 5 is a flow diagram of an example process for monitoring motion of a robotic manipulator.

In the example method of FIG. 5, monitoring (401) the motion of the robotic manipulator using the safety system comprises: dynamically and continuously calculating (501) at least one of: an estimated stopping time that the robot manipulator would spend to stop when applying at least one of the maximum possible torque or the maximum possible brake force; or an estimated stopping distance traveled by the robot manipulator while stopping when applying at least one of the maximum possible torque or the maximum possible brake force; and triggering (502) stopping of the robotic manipulator using the safety system in a case where at least one of: the estimated stopping time exceeds the stopping time limit; or the estimated stopping distance exceeds the stopping distance limit. The example method also includes extrapolating (503) the estimated stopping time and the estimated stopping distance from a current state of the robotic manipulator by applying the maximum possible torque and/or the maximum possible brake force for stopping current motion of the robotic manipulator, where extrapolation is performed until the robot manipulator is predicted to have reached a complete stop.

Figure 6:
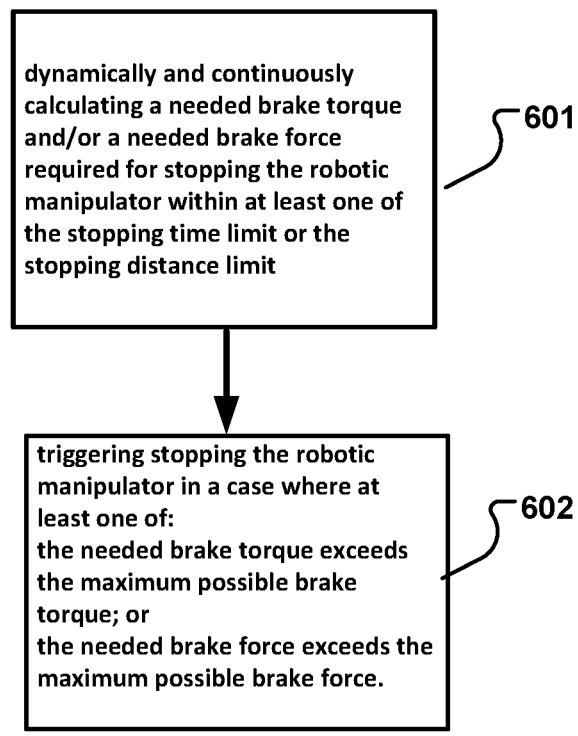
FIG. 6 is a flow diagram of an example process for monitoring motion of a robotic manipulator.

In the example method of FIG. 6, monitoring (401) the motion of the robotic manipulator using the safety system comprises: dynamically and continuously calculating (601) a needed brake torque and/or a needed brake force required for stopping the robotic manipulator within at least one of the stopping time limit or the stopping distance limit; and triggering (602) stopping the robotic manipulator in a case where at least one of: the needed brake torque exceeds the maximum possible brake torque; or the needed brake force exceeds the maximum possible brake force.

Figure 7:
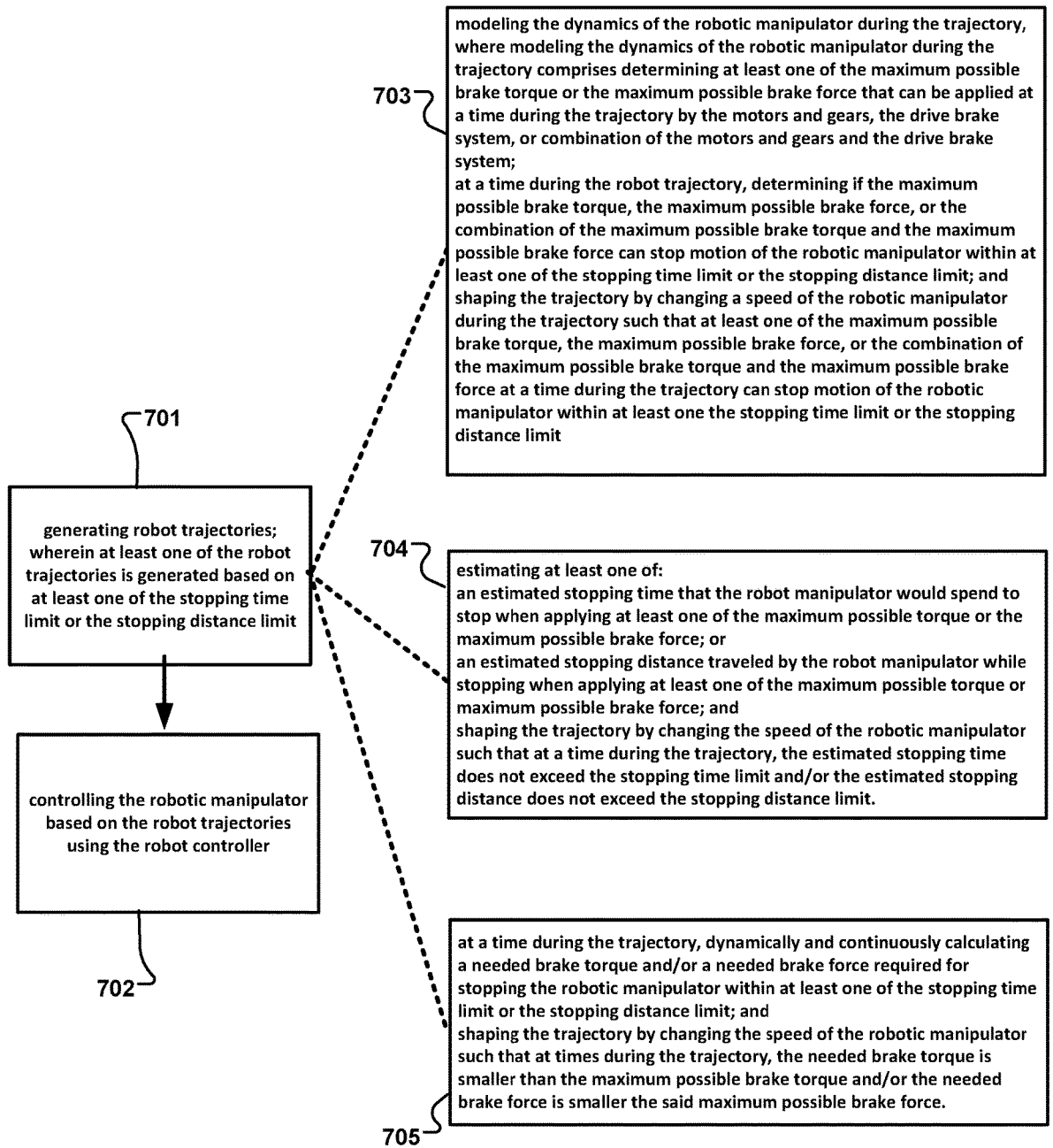
FIG. 7 is a flow diagram example processes for generating robot trajectories.

FIG. 7 shows an example method for generating (701) robot trajectories; and controlling (702) the robotic manipulator based on the robot trajectories using the robot controller. At least one of the robot trajectories is generated based on at least one of the stopping time limit or the stopping distance limit.

In example operations 703, generating a trajectory (701) among the robot trajectories comprises: modeling the dynamics of the robotic manipulator during the trajectory, where modeling the dynamics of the robotic manipulator during the trajectory comprises determining at least one of the maximum possible brake torque or the maximum possible brake force that can be applied at a time during the trajectory by the motors and gears, the drive brake system, or combination of the motors and gears and the drive brake system; at a time during the robot trajectory, determining if the maximum possible brake torque, the maximum possible brake force, or the combination of the maximum possible brake torque and the maximum possible brake force can stop motion of the robotic manipulator within at least one of the stopping time limit or the stopping distance limit; and shaping the trajectory by changing a speed of the robotic manipulator during the trajectory such that at least one of the maximum possible brake torque, the maximum possible brake force, or the combination of the maximum possible brake torque and the maximum possible brake force at a time during the trajectory can stop motion of the robotic manipulator within at least one the stopping time limit or the stopping distance limit.

In example operations 704, generating a trajectory (701) among the robot trajectories comprises: estimating at least one of an estimated stopping time that the robot manipulator would spend to stop when applying at least one of the maximum possible torque or the maximum possible brake force; or an estimated stopping distance traveled by the robot manipulator while stopping when applying at least one of the maximum possible torque or maximum possible brake force; and shaping the trajectory by changing the speed of the robotic manipulator such that at a time during the trajectory, the estimated stopping time does not exceed the stopping time limit and/or the estimated stopping distance does not exceed the stopping distance limit.

In example operations 705, generating a trajectory (701) among the robot trajectories comprises: at a time during the trajectory, dynamically and continuously calculating a needed brake torque and/or a needed brake force required for stopping the robotic manipulator within at least one of the stopping time limit or the stopping distance limit; and shaping the trajectory by changing the speed of the robotic manipulator such that at times during the trajectory, the needed brake torque is smaller than the maximum possible brake torque and/or the needed brake force is smaller the maximum possible brake force.

The present invention can also be described according to the statements I-IX (labeled with roman numbers) below.

I. A method for adjusting the trajectories for an industrial robot based on requirements for maximum allowed stopping time or stopping distance travel, such that the requirements are met independent of when the stop is initiated, said industrial robot having multiple degrees of freedom with built in control software to define a specific time or distance limit or both, wherein the robot is capable of stopping, said method comprises the steps of:
providing control software for generating the trajectories needed for solving the given tasks;
implementing a safety system which monitors the motions of the robotic manipulator and is capable of bringing the robot to a safe standstill, said safety system modelling the dynamics of the robot involving determining the maximum possible torque or force applied by motors and gears of the robot or by the drive brake system or by the combination of drive and brake system;
dynamically and continuously calculating the time the robot would need to stop or distance traveled by the robot while stopping at any given point in time; a user interface, which provides a means for a robot user or integrator to configure the stopping time or stopping distance limit or both; and
stopping the robot in case the estimated stopping time or distance of the current robot trajectory exceeds the stopping time or stopping distance limits.

II. The method of statement I, wherein the method is implemented as part of the functional safety of the robot.

III. The method of statement I or II, wherein the state of the robot is based on joint positions and joint speeds.

IV. The method of any one of the statements I-III, wherein the motions of the robot is extrapolated from the current state, where the maximum possible torque or force is applied for stopping the current motion, said extrapolation performed until the robot is predicted to have reached a complete stop.

V. The method of any one of preceding statements, wherein it is used for calculating both the time it takes for the robot to stop as well as the distance the robot moves while stopping.

VI. The method of any one of the preceding statements, wherein the functional safety is implemented by the use of redundancy of either sensors, communication, logics or any combination of them.

VII. The method of any one of the statements I-VI, wherein the correctness of the implementation and/or execution of the method is monitored by a safety function.

VIII. The method of claim VII, wherein the safety function is based on redundancy of either sensors, communication, logics or any combination of them.

IX. A robot system comprising:
a robot having a robotic manipulator;
control software for generating trajectories needed for solving given tasks; and for implementing a safety system which monitors the motions of the robotic manipulator and is capable of bringing the robot to a safe standstill, said safety system modelling the dynamics of the robot involving determining the maximum possible torque or force applied by motors and gears of the robot or by the drive brake system or by the combination of drive and brake system;
a means for triggering the stop of the robot while the control software dynamically and continuously calculating the time the robot would need to stop or distance traveled by the robot while stopping at any given point in time; wherein the triggering stopping the robot in case the estimated stopping time or distance of the current robot trajectory exceeds the stopping time or stopping distance limits.

X. The system according to statement IX, wherein the safety system is implemented by the use of redundancy of either sensors, communication, logics or any combination of them.

XII. The system according to statement IX or X, wherein the correctness of the implementation and/or execution of the safety system is monitored by a safety function.

XII. The system according to claim XI, wherein the safety function is based on redundancy of either sensors, communication, logics or any combination of them.

The invention claimed is:

1. A robot system comprising:
a robotic manipulator that is operable in multiple degrees of freedom;
a robot controller having control software for controlling the robotic manipulator;
a user interface; and
a safety system for monitoring motion of the robotic manipulator, the safety system being configured to bring the robotic manipulator to a stop;

wherein the user interface is configured to enable a user to set at least one of a stopping time limit or a stopping distance limit for the robotic manipulator; and wherein the safety system is configured to perform operations comprising:

modeling dynamics of the robotic manipulator, where modeling comprises determining at least one of a maximum possible brake torque or a maximum possible brake force that can be applied by motors and gears of the robotic manipulator, a drive brake system of the robotic manipulator, or a combination of the motors and gears and the drive brake system;

dynamically and continuously determining if the maximum possible brake torque, the maximum possible brake force, or a combination of the maximum possible brake torque and the maximum possible brake force can stop motion of the robotic manipulator within at least one of the stopping time limit or the stopping distance limit; and triggering stopping the robotic manipulator in a case where at least one of the maximum possible brake torque, the maximum possible brake force, or the combination of the maximum possible brake torque and the maximum possible brake force cannot stop motion of the robotic manipulator within at least one of the stopping time limit or and the stopping distance limit.

2. The robot system of claim 1 wherein the safety system is configured to perform operations comprising:

dynamically and continuously calculating at least one of:

an estimated stopping time that the robot manipulator would spend to stop when applying at least one of the maximum possible torque or the maximum possible brake force; or an estimated stopping distance traveled by the robot manipulator while stopping when applying at least one of the maximum possible torque or the maximum possible brake force; and triggering stopping the robotic manipulator in a case where at least one of:

the estimated stopping time exceeds the stopping time limit; or the estimated stopping distance exceeds the stopping distance limit.

3. The robot system of claim 2, wherein the safety system is configured to extrapolate at least one of the estimated stopping time or the estimated stopping distance from a current state of the robotic manipulator, where the maximum possible torque and/or the maximum possible brake force is applicable for stopping current motion of the robotic manipulator, and where extrapolation is to be performed until the robot manipulator is determined to have reached a complete stop.

4. The robot system of claim 1, wherein the safety system is configured to perform operations comprising:

dynamically and continuously calculating a needed brake torque and/or a needed brake force required for stopping the robotic manipulator within at least one of the stopping time limit or the stopping distance limit; and triggering stopping of the robotic manipulator in a case where at least one of:

the needed brake torque exceeds the maximum possible brake torque; or the needed brake force exceeds the maximum possible brake force.

5. The robot system of claim 1, wherein the control software is configured to generate robot trajectories, and wherein controlling the robotic manipulator is based on the robot trajectories.

6. The robot system according to claim 5, wherein the control software is configured to generate at least one of the robot trajectories based on at least one of the stopping time limit or the stopping distance limit.

7. The robot system of claim 5, wherein the control software is configured to generate a trajectory among the robot trajectories by performing operations comprising:

modeling the dynamics of the robotic manipulator during the trajectory, where modeling the dynamics of the robotic manipulator during the trajectory comprises determining at least one of the maximum possible brake torque or the maximum possible brake force that can be applied at a time during the trajectory by the motors and gears, the drive brake system, or the combination of the motors and gears and the drive brake system;

at a time during the trajectory, determining if the maximum possible brake torque, the maximum possible brake force, or the combination of the maximum possible brake torque and the maximum possible brake force can stop motion of the robotic manipulator within at least one of the stopping time limit or the stopping distance limit; and shaping the trajectory by changing a speed of the robotic manipulator during the trajectory such that at least one of the maximum possible brake torque, the maximum possible brake force, or the combination of the maximum possible brake torque and the maximum possible brake force at a time during the trajectory can stop motion of the robotic manipulator within at least one of the stopping time limit or the stopping distance limit.

8. The robot system of claim 5, wherein the control software is configured to generate a trajectory among the robot trajectories by performing operations comprising:

estimating at least one of:

an estimated stopping time that the robot manipulator would spend to stop when applying at least one of the maximum possible torque or the maximum possible brake force; or an estimated stopping distance traveled by the robot manipulator while stopping when applying at least one of the maximum possible torque or the maximum possible brake force; and shaping the trajectory by changing a speed of the robot manipulator such that at a time during the trajectory, the estimated stopping time does not exceed the stopping time limit and/or the estimated stopping distance does not exceed stopping distance limit.

9. The robot system of claim 5, wherein the control software is configured to generate a trajectory among the robot trajectories by performing operations comprising:

at a time during the trajectory, dynamically and continuously calculating a needed brake torque and/or a needed brake force required for stopping the robotic manipulator within at least one of the stopping time limit or the stopping distance limit; and shaping the trajectory by changing a speed of the robotic manipulator during the trajectory such that at times during the trajectory, the needed brake torque is smaller than the maximum possible brake torque and/or the needed brake force is smaller than the maximum possible brake force.

10. A method of controlling a robot system that comprises: a robotic manipulator that is operable in multiple degrees of freedom, a robot controller having control software for controlling the robotic manipulator, a user interface, and a safety system for monitoring motion of the robotic manipulator, the safety system being configured to bring the robotic manipulator to a stop, the method comprising:

receiving at least one of a stopping time limit or a stopping distance limit for the robotic manipulator via the user interface; and monitoring the motion of the robotic manipulator using the safety system, where monitoring the motion of the robotic manipulator comprises:

modeling dynamics of the robotic manipulator, where modeling comprises determining at least one of a maximum possible brake torque or a maximum possible brake force that can be applied by motors and gears of the robotic manipulator, a drive brake system of the robotic manipulator, or a combination of the motors and gears and the drive brake system;

dynamically and continuously determining if the maximum possible brake torque, the maximum possible brake force, or the combination of the maximum possible brake torque and the maximum possible brake force can stop motion of the robotic manipulator within at least one of the stopping time limit or the stopping distance limit; and triggering stopping the robotic manipulator in a case where at least one of the maximum possible brake torque, the maximum possible brake force, or the combination of the maximum possible brake torque and the maximum possible brake force cannot stop motion of the robotic manipulator within at least one of the stopping time limit or the stopping distance limit.

11. The method according to claim 10, wherein monitoring the motion of the robotic manipulator using the safety system comprises:

dynamically and continuously calculating at least one of:
an estimated stopping time that the robot manipulator would spend to stop when applying at least one of the maximum possible torque or the maximum possible brake force; or
an estimated stopping distance traveled by the robot manipulator while stopping when applying at least one of the maximum possible torque or the maximum possible brake force; and triggering stopping of the robotic manipulator using the safety system in a case where at least one of:
the estimated stopping time exceeds the stopping time limit; or
the estimated stopping distance exceeds the stopping distance limit.

12. The method of claim 11, further comprising:
extrapolating the estimated stopping time and the estimated stopping distance from a current state of the robotic manipulator by applying the maximum possible torque and/or the maximum possible brake force for stopping current motion of the robotic manipulator, where extrapolation is performed until the robot manipulator is predicted to have reached a complete stop.

13. The method of claim 10, wherein monitoring the motion of the robotic manipulator using the safety system comprises:

dynamically and continuously calculating a needed brake torque and/or a needed brake force required for stopping the robotic manipulator within at least one of the stopping time limit or the stopping distance limit; and triggering stopping the robotic manipulator in a case where at least one of:
the needed brake torque exceeds the maximum possible brake torque; or
the needed brake force exceeds the maximum possible brake force.

14. The method of claim 10, further comprising:
generating robot trajectories; and
controlling the robotic manipulator based on the robot trajectories using the robot controller.

15. The method of claim 14, wherein at least one of the robot trajectories is generated based on at least one of the stopping time limit or the stopping distance limit.

16. The method of claim 14, wherein generating a trajectory among the robot trajectories comprises:
modeling the dynamics of the robotic manipulator during the trajectory, where modeling the dynamics of the robotic manipulator during the trajectory comprises determining at least one of the maximum possible brake torque or the maximum possible brake force that can be applied at a time during the trajectory by the motors and gears, the drive brake system, or combination of the motors and gears and the drive brake system;

at a time during the robot trajectory, determining if the maximum possible brake torque, the maximum possible brake force, or the combination of the maximum possible brake torque and the maximum possible brake force can stop motion of the robotic manipulator within at least one of the stopping time limit or the stopping distance limit; and shaping the trajectory by changing a speed of the robotic manipulator during the trajectory such that at least one of the maximum possible brake torque, the maximum possible brake force, or the combination of the maximum possible brake torque and the maximum possible brake force at a time during the trajectory can stop motion of the robotic manipulator within at least one of the stopping time limit or the stopping distance limit.

17. The method of claim 14, wherein generating a trajectory among the robot trajectories comprises:
estimating at least one of:
an estimated stopping time that the robot manipulator would spend to stop when applying at least one of the maximum possible torque or the maximum possible brake force; or
an estimated stopping distance traveled by the robot manipulator while stopping when applying at least one of the maximum possible torque or maximum possible brake force; and shaping the trajectory by changing the speed of the robotic manipulator such that at a time during the trajectory, the estimated stopping time does not exceed the stopping time limit and/or the estimated stopping distance does not exceed the stopping distance limit.

18. The method of claim 14, wherein generating a trajectory among the robot trajectories comprises:
at a time during the trajectory, dynamically and continuously calculating a needed brake torque and/or a needed brake force required for stopping the robotic manipulator within at least one of the stopping time limit or the stopping distance limit; and shaping the trajectory by changing the speed of the robotic manipulator such that at times during the trajectory, the needed brake torque is smaller than the maximum possible brake torque and/or the needed brake force is smaller than the maximum possible brake force.

* * * * *